United States Patent [19]

Bogdany

[11] 4,423,103
[45] Dec. 27, 1983

[54] PATTERNIZED COATING

[75] Inventor: John Bogdany, Fort Oglethorpe, Ga.

[73] Assignee: The General Tire & Rubber Company, Akron, Ohio

[21] Appl. No.: 501,580

[22] Filed: Jun. 6, 1983

[51] Int. Cl.³ .......................... B32B 3/30; B32B 5/20
[52] U.S. Cl. ...................................... 428/95; 427/271;
427/356; 428/159; 428/167; 428/304.4
[58] Field of Search ............. 428/95, 159, 167, 304.4;
427/271, 355, 356

[56] References Cited

U.S. PATENT DOCUMENTS 3,215,647 11/1965 Dunn ................................ 428/304.4
3,810,808 5/1974 Anderson ......................... 428/304.4
4,081,579 3/1978 Queen et al. .......................... 428/95

Primary Examiner—William J. Van Balen

[57] ABSTRACT

A pattern is produced on the polymeric frothed coating on a substrate by reciprocating a rake through the froth on the substrate as the froth carried by the substrate moves under the rake. After curing and drying there is provided a substrate having an adherent resilient sponge or cellular pattern.

12 Claims, 5 Drawing Figures

PATTERNIZED COATING

This invention relates to a process for forming patterns on fabrics such as carpets.

OBJECTS

It is an object of the present invention to provide a method or process for forming a pattern on a fabric substrate.

These and other objects and advantages of the present invention will become more apparent to those skilled in the art from the following detailed description and accompanying drawings in which.

SUMMARY OF THE INVENTION

According to the present invention, a rake or similar device is reciprocated through a froth or foamed layer carried by an advancing fabric substrate and then cured to form an adherent solid, cellular, porous or frothed patterned layer on the fabric. Forming a pattern on the fabric by the present invention provides a more resilient layer than when a continuous flat froth layer is provided, especially when a carpet is the substrate for application of the foam. Moreover, forming a pattern by the present process avoids the need for the use of embossing rolls or other devices to form patterns or the need for forming a separate cellular or frothed molded or embossed layer which then is secured to the substrate using adhesives. The method of the present invention is particularly useful for forming decorative integral cellular foam carpet or rug underlay or backing. This invention, also, provides for the production of a patternized direct no gel poured-on wet foam simulating the appearance and cushioning of sponge rubber carpet underlay. The speed of the rake through the froth can produce any number of designs in the froth on the substrate. Also, the rake can be operated at different angles or even stopped for a while to provide a length of carpet having different rug underlay patterns along its entire length.

DISCUSSION OF DETAILS AND PREFERRED EMBODIMENTS

Figure 1:
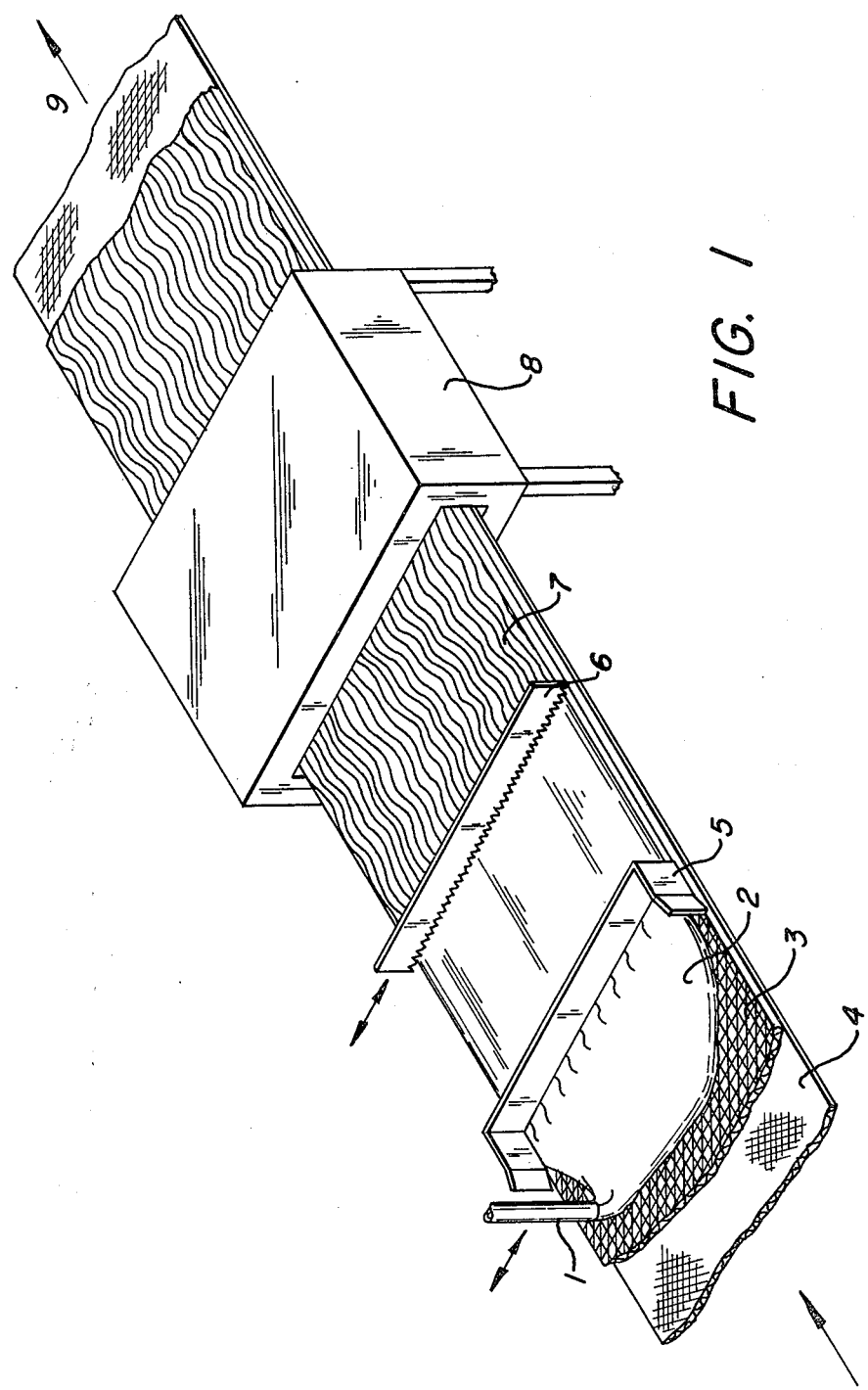
FIG. 1 is a fragmentary perspective view of an arrangement of apparatus for carrying out the method of the present invention.

As shown in FIG. 1 traversing hose (TYGON (modified plasticized polyvinyl chloride, Norton Company) 1½ to 2½ inches ID reinforced delivery hose) having nozzle or spout 1 deposits froth or foam 2 of a filled carboxylated butadienestyrene copolymer latex composition from froth supply source (not shown) on the surface of advancing fabric 3 such as the back of a carpet supplied from let-off roll (not shown) and carried by conveyor or tenter 4. Doctor blade 5 serves to spread the froth evenly across the surface of the fabric. Beyond doctor blade 5 there is positioned vertically disposed and reciprocating rake 6 having tines which pass through at least a substantial amount of the upper surface layers or mass of the froth to form serpentine pattern 7 in the froth layer. The conveyor then carries the fabric and its patterned froth layer through curing and/or drying oven 8 where the foam is cured and/or set and adhered to said backing to form a solid pattern. From the oven the laminate is then carried in the direction of arrow 9 to a wind-up roll (not shown).

Figure 2:
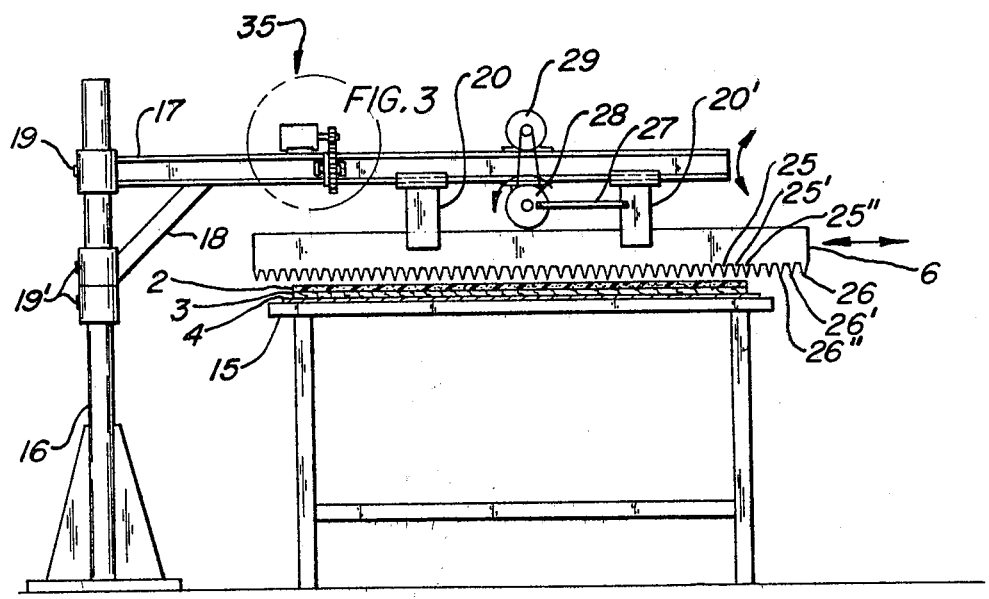
FIG. 2 is a vertical partially cross-sectional view of an arrangement of apparatus for effecting patternizing of a substrate.

In FIG. 2 there is shown conveyor or tenter frame or support 15 for conveyor 4 carrying fabric 3 and froth 2. Disposed at the side of conveyor frame 15 is post 16 holding arm 17. Brace 18 aids in support of arm 17 on post 16. Set screws 19, 19' hold the arm in position on the post. Thus, arm 17 can be elevated up, lowered down or rotated around post 16 and then held in place as desired by set screws 19, 19'. Slidable or movable holders 20, 20' contain bolts or screws for adjustably securing and holding rake 6 disposed above froth 2. Rake 6 defines a saw-like parallelogram shaped member having a plurality of evenly spaced inverted pyramidal shaped tines 25, 25', 25" with sharp points 26, 26', 26". Rake 6 is connected by rod or shaft 27 to eccentric 28 (or a cam) driven by motor (electric) 29. Motor 29 drives eccentric 28 to cause reciprocation of rake 6. Suitable means not shown such as a motor controller and gear reduction box are used to control speed. Also, control means not shown are used to coordinate the speed of the conveyor with the action of the rake so that the desired pattern is obtained without destroying the froth.

Figure 3:
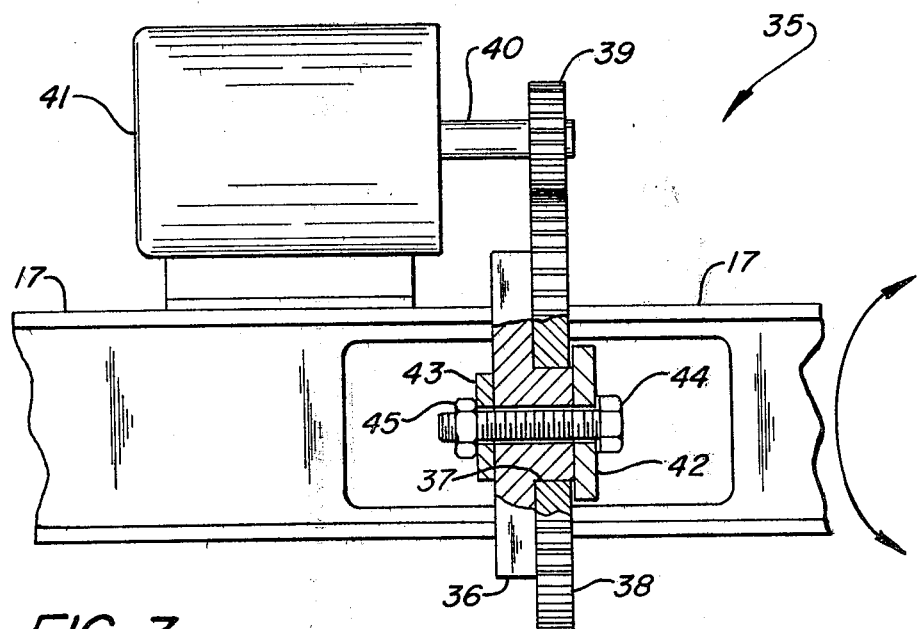
FIG. 3 is an enlarged vertical partially cross-sectional detailed view of an arrangement of apparatus for changing the angle of the patternizing apparatus.

FIG. 3 is an expanded vertical partially cross sectional view of a portion of FIG. 2 showing generally at 35 means for rotating rake 6 and its cooperating apparatus through an angle of 45 to 135 degrees to the surface of the froth although it is preferred to operate with the rake perpendicular, e.g., at about 90 degrees to the surface of the froth. The angle may be governed by the desired pattern requirements in the finished product. As shown in FIG. 3 arm 17 has been bifurcated. To one end of the arm has been fastened (welded) plate 36 having integral bearing 37. To the other end of arm 17 is fastened (welded) gear 38 mounted to rotate on bearing 37. Gear 39 driven by shaft 40 by motor 41 (electric) rotates in the desired direction gear 38 to which is connected that portion of the bifurcated arm 17 containing rake 6. Shaft 40 can be driven to rotate gear 39 and then gear 38 either clockwise or counterclockwise. The two bifurcated arms are joined together but can rotate relative to each other by means of thick washer 42 pressing against plate 36 and thick washer 43 pressing against plate 36 and secured by bolt 44 and cap nut 45.

While electric motors have been shown for use as the driving means, hydraulic power or other means can be used for operating the apparatus.

Figure 4:
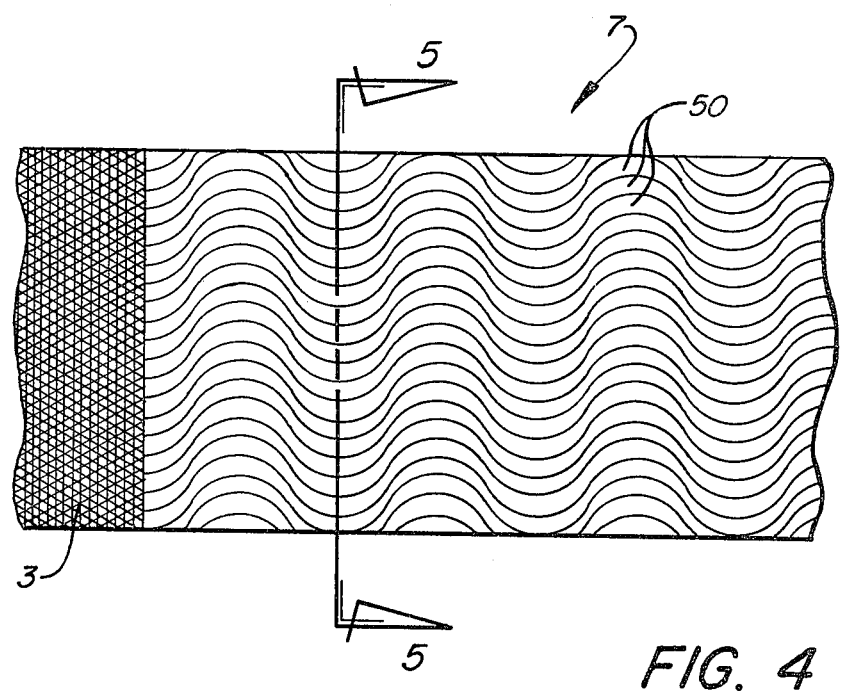
FIG. 4 is a perspective, partially top plan view of a product of the present invention showing a substrate having a plurality of serpentine rows of a froth coating on the surface
Figure 5:
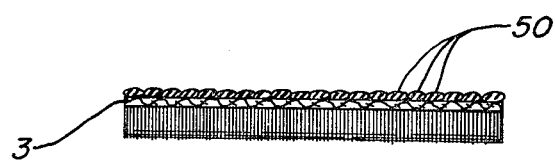
FIG. 5 is a cross-sectional view along the line 5—5 of FIG. 4.

FIGS. 4 and 5 show a product resulting from practice of the present invention. Here, the rake has produced parallel serpentine rows 50 of froth coating the back of the carpet. Although rake 6 initially may produce sharp hills and valleys in the froth layer corresponding to the tines of rake 6, continual passage of the froth down the conveyor and through the oven may permit the froth to reflow slightly and the rows to assume a more rounded appearance.

The rake can carry any number of tines (teeth or prongs). The tines of the rake may be triangular or v-shaped, round, rectangular and so forth. The tips of the tines likewise may be sharp, round, square or flat and so forth depending on the desired pattern. Also, the tines and tips of the tines of the rake do not all have to be of the same configuration but can be of different configurations or shapes on the same rake to form different patterns. The horizontal movement of the rake across the froth may be from about ⅛ to 2 inches. The rake is positioned behind the doctor blade or bar (after the froth has been doctored to the required thickness) from about 3 to 20 feet depending on the type of polymer system used and pot life of the system. The rake should be floating near the surface of the coated fabric where the distance from the fabric depends on the fabric construction (upholstery, drapery, carpets, clothesliners and so forth). Moreover, while the drawings disclose only one rake it is apparent that more than one rake can be used to make more complicated patterns. While the shape of the rake has been shown to be that of a generally flat parallelogram, it can be of other design, shape or structure so long as it achieves the desired pattern in the froth.

The froth viscosity or viscosity of the froth composition (filled) should be in the range of from about 5,000 to 150,000 cps, preferably from about 10,000 to 30,000 cps, and should have the integrity to hold the pattern or design during cure and/or drying at 150° to 350° F. The froth density is determined by finished product requirements. The thickness of the froth can depend on end use requirements and can be from about 1/16 to ½ inch. The froth can be prepared by whipping air or an inert gas into a liquid organic polymeric composition using a HOBART or KITCHEN-AID mixer. The width of the substrate can be from about 3 to 15 feet depending on equipment size and requirements. The residence time and temperature in the oven is dependent on the type of fabric, thickness of froth layer, total solids in froth and polymer system. For example, conventional direct pour-on froths are usually cured in from about 10 to 25 minutes at 325° F. at a froth thickness of ⅛". On the other hand, polyurethane foams are cured primarilly through exotherm reaction but with a slight amount of added heat (from about 180° to 200° F.) for from about 2 to 5 minutes to eliminate tack. Long times and high temperatures in the oven should be avoided to prevent deterioration of the froth or cellular coating and substrate.

While the present invention has been described as disclosing that the substrate is a carpet or rug, it is not to be considered as being limited thereto, but other materials can be used such as fabrics or textiles, e.g., upholstery, drapery, clothes-lining and so forth. The substrate fabric can be woven, knitted or non-woven or mixture thereof. Also, while the present invention has been described as useful for application of froths to backings of carpets, it, also, can be applied to the face of fabrics or can be an exposed or exterior patterned frothed layer.

The materials of which the fabric is made can be natural or synthetic fibers or mixtures thereof such as cotton, wool, jute, paper, cellulose, linen, silk, polyester, polyamide (nylon), rayon, acrylonitrile polymers, vinylidene chloride polymers, polypropylene, acrylics, glass fibers, boron fibers, carbon fibers and so forth.

The polymers of the liquid froth may be random, linear or branched, graft or block homopolymers and copolymers which may or may not contain gel. They should have an average molecular weight of at least about 50,000 so that in dry form they are solid and flexible or resilient. The polymer used to make the froth can be any liquid polymer or polymeric reaction mixture such as a liquid catalyzed polyisocyanate-polyol surfactant system which may require altering the tines of the rake. It is preferred to use aqueous dispersions, emulsions or latices of polymers and copolymers and mixtures thereof. Examples of such polymeric latices are those of acrylic ester polymers and copolymers such as those from the copolymerization of butyl acrylate, octyl acrylate, methyl methacrylate and the like with themselves are with acrylonitrile, acrylamide, acrylic acid, butadiene and so forth, ethylene-vinyl acetate copolymers, polybutadiene, polyisoprene, butadiene-isoprene copolymers, butyl, polychloroprene, natural rubber, isoprene-acrylonitrile copolymers, butadiene-acrylonitrile copolymers, butadiene-styrene-acrylonitrile copolymers, butadiene-styrene copolymers, carboxylated butadiene copolymers and the like and mixtures of the same. It is even more preferred to use latices of a carboxylated conjugated diene copolymer of (a) from about 30 to 60 parts by weight of at least one conjugated diene monomer having from 4 to 6 carbon atoms, (b) from about 40 to 65 parts by weight of at least one copolymerizable vinyl aryl monomer having from 8 to 12 carbon atoms and (c) from 0.5 to 10 parts by weight of at least one copolymerizable unsaturated aliphatic monomer having from 1 to 2 COOH groups and a total of from 3 to 5 carbon atoms. Examples of (a) are butadiene-1,3 (preferred), isoprene, 2,3-dimethyl butadiene-1,3 and piperylene. Examples of (b) are styrene (preferred), alpha methyl styrene, p-tertiary butyl styrene, para methyl styrene, methyl vinyl toluene and 3-ethyl styrene. Examples of (c) are acrylic, methacrylic, fumaric, maleic, itaconic and crotonic acids of which acrylic, methacrylic, fumaric and itaconic acids and mixtures thereof are preferred. Mixtures of latices of the foregoing polymers and copolymers may be used.

The latices are made by free radical aqueous emulsion polymerization. Free radical aqueous emulsion polymerization and copolymerization of ethylenically unsaturated monomers is well known to those skilled in the art. In this connection please see Whitby et al, "Synthetic Rubber," John Wiley & Sons, Inc., New York, 1954; Bovey et al., "Emulsion Polymerization," High Polymers, Vol. IX, Interscience Publishers, Inc., 1955; Schildknecht, "Vinyl and Related Polymers," John Wiley & Sons, Inc., New York, 1952; "Encyclopedia of Polymer Science and Technology," Vol. 3 (1965), Vol. 5 (1966), Vol. 7 (1967), Vol. 9 (1968) and Vol. 11 (1969), Interscience Publishers, a division of John Wiley & Sons, Inc., New York and U.S. Pat. No. 4,145,494. The technique of polymerizing or copolymerizing one or more monomers in the presence of a polymer or a substrate, "grafting technique," is known and is frequently called graft polymerization or graft copolymerization. In this connection, please see "Proceedings Of The Third Rubber Technology Congress," 1954, W. Heffer & Sons, Ltd., Cambridge, pages 185–195; Ham, "Copolymerization," High Polymers, Vol. XVIII, Interscience Publishers a division of John Wiley & Sons, New York, 1964; Burlant and Hoffman, "Block and Graft Polymers," Reinhold Publishing Corporation, New York, 1960; Ceresa, "Block and Graft Copolymers," Butterworth & Co. (Publishers) Ltd., London, 1962; Ceresa, "Block and Graft Copolymerization," Vol. 1 (1973) and Vol. 2 (1976), John Wiley & Sons, Ltd., New York; and Battaerd and Tregear, "Graft Copolymers,"

Polymer Reviews, Vol. 16, Interscience Publishers, a division of John Wiley & Sons, New York, 1967. The graft copolymer may contain all graft copolymer but also may be a mixture of homopolymers, copolymers as well as the graft itself, depending on the rate of polymerization of the monomers under the polymerization conditions and so forth.

These polymers may be filled with soft clays, hard clays, barytes, silicas and sillicates, calcium carbonate, alumina trihydrate and so forth as well as antidegradants, fire and flame retardants, biocides and so forth. The fillers may be used in an amount of up to about 500 phr (parts by weight per 100 parts by weight of rubber), preferably from about 100 to 300 phr. It is preferred to use fillers with the polymer.

The froth aid can be sodium lauryl sulfate, natural fatty acid soaps, silicones and so forth. U.S. Pat. No. 4,172,067 discloses a froth aid useful for a carboxylated latex comprising urea, sodium salt of condensed naphthalene sulfonic acid, a blend of $C_8$ to $C_{18}$ fatty alcohols, ammonium or sodium lauryl sulfate and water.

Carpet backing, froth aids, latices and apparatus are disclosed in the following U.S. patents: U.S. Pat. No. Re. 28,682; U.S. Pat. Nos. 3,516,975; 3,549,589; 3,804,700; 3,849,156; 4,049,587; 4,096,303; 4,197,342; 4,239,821; 4,288,486 and 4,323,474.

I claim:

1. The method which comprises pouring and spreading a liquid frothed organic polymeric composition on the advancing surface of a fabric to form a froth layer of substantially uniform gauge on said fabric, creating a pattern on said froth by reciprocating at least one rake having a plurality of tines across and through said froth as it is advanced and carried by said fabric beneath said rake, said tines penetrating at least the outer surface layers of said froth and said tines of said rake being positioned at an angle of from about 45 to 135 degrees to the surface of said froth, and curing said froth to provide a fabric with a solid, adherent, patterned froth or cellular layer on said fabric.

2. The method according to claim 1 where said fabric is a carpet, said froth is applied to the back of said carpet, said froth comprises a filled resilient carboxylated diene copolymer latex, said rake is positioned at an angle of about 90 degrees to the surface of said froth and said rake is reciprocated substantially horozonitally a distance of from about ⅛ to 2 inches across and substantially through said froth to provide a resilient pattern.

3. The method according to claim 2 where the copolymer of said latex comprises a copolymer of (a) from about 30 to 60 parts by weight of at least one conjugated diene monomer having from 4 to 6 carbon atoms, (b) from about 40 to 65 parts by weight of at least one copolymerizable vinyl aryl monomer having from 8 to 12 carbon atoms and (c) from about 0.5 to 10 parts by weight of at least one copolymerizable unsaturated aliphatic monomer having from 1 to 2 COOH groups and a total of from 3 to 5 carbon atoms and mixtures thereof.

4. The method according to claim 3 where (a) is butadiene-1,3, (b) is styrene and (c) is selected from the group consisting of acrylic acid, methacrylic acid, fumaric acid and itaconic acid and mixtures thereof.

5. The product produced by the method of claim 1.

6. The product produced by the method of claim 2.

7. The product produced by the method of claim 3.

8. The product produced by the method of claim 4.

9. A carpet having a resilient foam underlay adhered to the back of said carpet and comprising a plurality of parallel, serpentine rows of a cured cellular organic polymeric composition.

10. A carpet according to claim 9 where said organic polymeric composition comprises a filled carboxylated diene copolymer.

11. A carpet according to claim 10 where said copolymer comprises a copolymer of (a) from about 30 to 60 parts by weight of at least one conjugated diene monomer having from 4 to 6 carbon atoms, (b) from about 40 to 65 parts by weight of at least one copolymerizable vinyl aryl monomer having from 8 to 12 carbon atoms and (c) from about 0.5 to 10 parts by weight of at least one copolymerizable unsaturated aliphatic monomer having from 1 to 2 COOH groups and a total of from 3 to 5 carbon atoms and mixtures thereof.

12. A carpet according to claim 11 where (a) is butadiene-1,3, (b) is styrene and (c) is selected from the group consisting of acrylic acid, methacrylic acid, fumaric acid and itaconic acid and mixtures thereof.

* * * * *